(12) United States Patent
Park et al.

(10) Patent No.: US 11,316,183 B2
(45) Date of Patent: Apr. 26, 2022

(54) COMPOSITE ELECTROLYTE FILM, REINFORCED COMPOSITE ELECTROLYTE FILM, AND FUEL CELL COMPRISING SAME

(71) Applicant: LG CHEM, LTD., Seoul (KR)

(72) Inventors: Curie Park, Daejeon (KR); Hyuk Kim, Daejeon (KR); Minkyu Min, Daejeon (KR); Ji Hun Kim, Daejeon (KR); Insung Bae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 216 days.

(21) Appl. No.: 15/749,314

(22) PCT Filed: Sep. 1, 2016

(86) PCT No.: PCT/KR2016/009762
§ 371 (c)(1),
(2) Date: Jan. 31, 2018

(87) PCT Pub. No.: WO2017/039340
PCT Pub. Date: Mar. 9, 2017

(65) Prior Publication Data
US 2018/0226670 A1    Aug. 9, 2018

(30) Foreign Application Priority Data
Sep. 1, 2015   (KR) .................. 10-2015-0123700

(51) Int. Cl.
*H01M 8/1041*   (2016.01)
*H01M 8/1051*   (2016.01)
*H01M 8/102*    (2016.01)
(Continued)

(52) U.S. Cl.
CPC ......... *H01M 8/1041* (2013.01); *H01M 8/102* (2013.01); *H01M 8/1004* (2013.01);
(Continued)

(58) Field of Classification Search
CPC ............ H01M 8/1004; H01M 8/1018; H01M 2008/1095; H01M 8/1041; H01M 8/24; H01M 8/1051; C01B 33/12
(Continued)

(56) References Cited

U.S. PATENT DOCUMENTS

| 7,811,694 B2 | 10/2010 | Song et al. | |
| 2004/0043297 A1* | 3/2004 | Goto | B01D 69/141 |
| | | | 429/316 |
| 2005/0053818 A1* | 3/2005 | St-Arnaud | B01D 61/243 |
| | | | 429/431 |
| 2006/0083962 A1* | 4/2006 | Takekawa | B01D 67/0093 |
| | | | 428/304.4 |

(Continued)

FOREIGN PATENT DOCUMENTS

| CN | 1921192 A | 2/2007 |
| CN | 101038965 A | 9/2007 |
| CN | 102460792 A | 5/2012 |

(Continued)

OTHER PUBLICATIONS

Chibatakahito et al. JP 2005285413(A)—Oct. 13, 2005 "Proton conductive membrane, its manufacturing method, and solid polymer type fuel cell using proton conductive membrane" English language machine translation. (Year: 2005).*

*Primary Examiner* — Olatunji A Godo
*Assistant Examiner* — Omar M Kekia
(74) *Attorney, Agent, or Firm* — Birch, Stewart, Kolasch & Birch, LLP

(57) ABSTRACT

The present specification relates to a complex electrolyte membrane, an enhanced complex electrolyte membrane and a fuel cell including the same.

15 Claims, 4 Drawing Sheets

(51) Int. Cl.
*H01M 8/1004* (2016.01)
*H01M 8/24* (2016.01)
*C01B 33/12* (2006.01)
*H01M 8/10* (2016.01)

(52) U.S. Cl.
CPC .......... *H01M 8/1051* (2013.01); *H01M 8/24* (2013.01); *C01B 33/12* (2013.01); *H01M 2008/1095* (2013.01)

(58) Field of Classification Search
USPC ........................................................ 429/492
See application file for complete search history.

(56) References Cited

U.S. PATENT DOCUMENTS

| | | | |
|---|---|---|---|
| 2007/0048594 A1 | 3/2007 | Oh et al. | |
| 2007/0065699 A1* | 3/2007 | Larson | C08J 5/22 429/494 |
| 2009/0163637 A1* | 6/2009 | Li | C08K 3/22 524/413 |
| 2009/0176141 A1* | 7/2009 | Santurri | H01M 8/1023 429/494 |
| 2012/0064431 A1 | 3/2012 | Sato et al. | |

FOREIGN PATENT DOCUMENTS

| | | |
|---|---|---|
| JP | 2005-285413 A | 10/2005 |
| JP | 2009-26603 A | 2/2009 |
| JP | 2012-69536 A | 4/2012 |
| KR | 10-2011-0007350 A | 1/2011 |
| KR | 10-2015-0060394 A | 6/2015 |

\* cited by examiner

[FIG. 1]
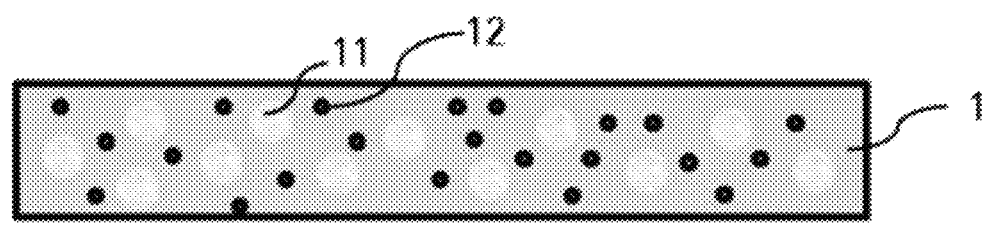
[FIG. 2]
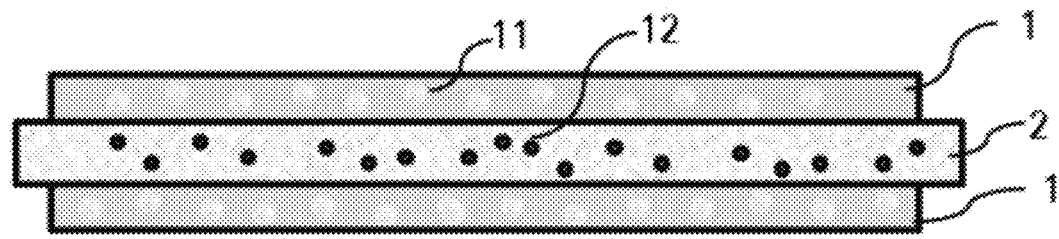
[FIG. 3]
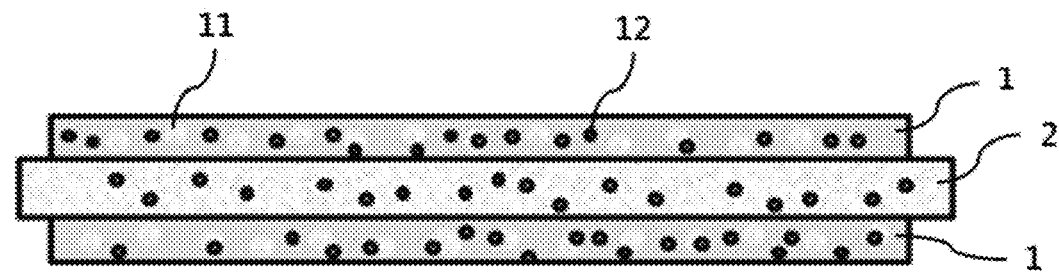

[FIG. 4]
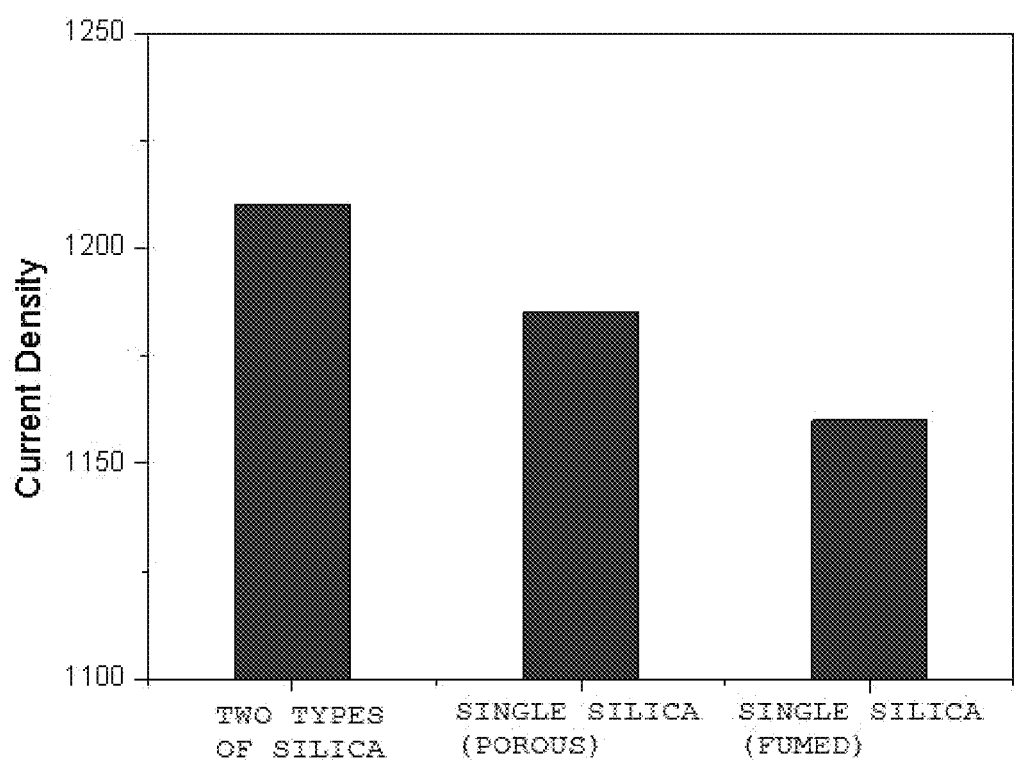

[FIG. 5]
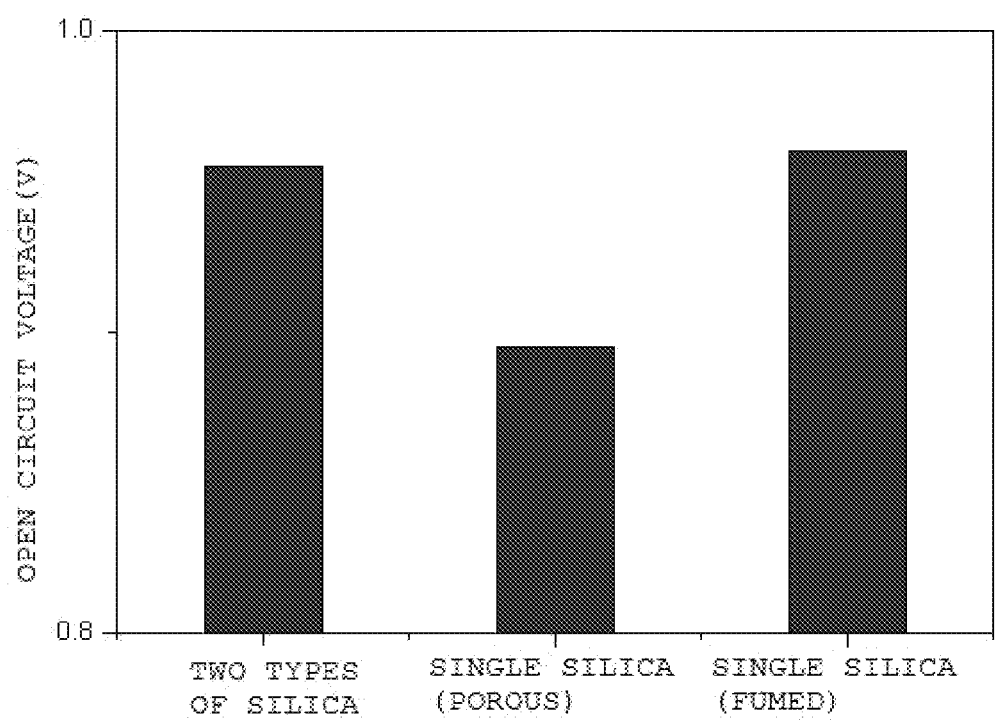

[FIG. 6]
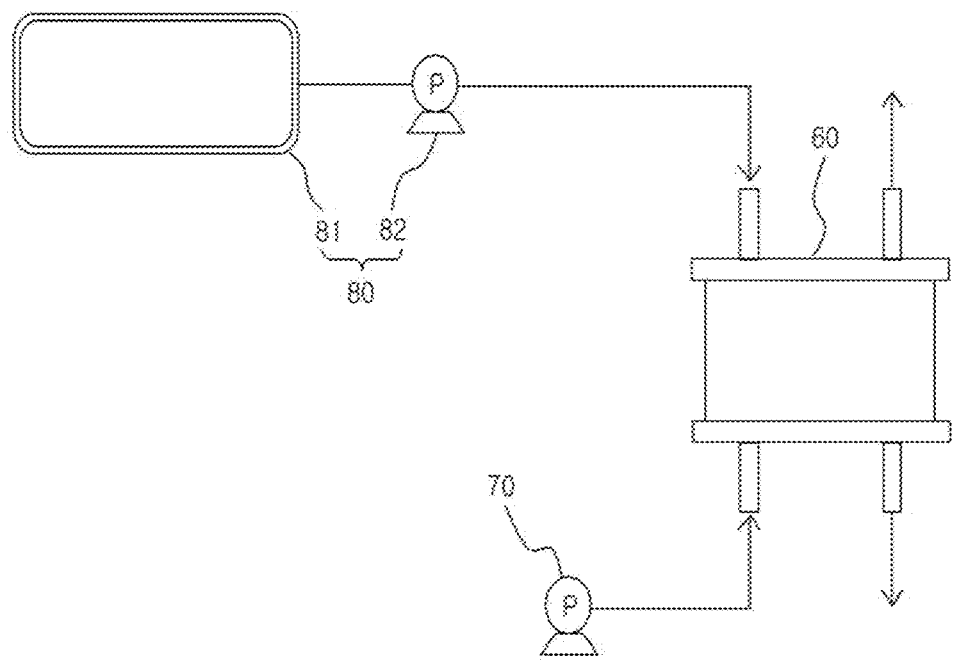

COMPOSITE ELECTROLYTE FILM, REINFORCED COMPOSITE ELECTROLYTE FILM, AND FUEL CELL COMPRISING SAME

TECHNICAL FIELD

The present specification relates to a complex electrolyte membrane, an enhanced complex electrolyte membrane and a fuel cell including the same.

BACKGROUND ART

With recent predictions about the exhaustion of existing energy resources such as petroleum and coal, interests in alternative energy capable of replacing these have been growing. As one of such alternative energy, fuel cells have received particular attention with advantages of being highly efficient, not emitting pollutants such as NOx and SOx, and having sufficient fuel to use.

Fuel cells are a power generating system converting chemical reaction energy of fuel and oxidizer to electric energy, and hydrogen, methanol and hydrocarbon such as butane are used as the fuel, and oxygen is typically used as the oxidizer.

Fuel cells include polymer electrolyte membrane-type fuel cells (PEMFC), direct methanol-type fuel cells (DMFC), phosphoric acid-type fuel cells (PAFC), alkaline-type fuel cells (AFC), molten carbonate-type fuel cells (MCFC), solid oxide-type fuel cells (SOFC) and the like. Among these, polymer electrolyte membrane-type fuel cells have been most actively studied due to their high energy density and high output. Such polymer electrolyte membrane-type fuel cells are different from other fuel cells in that a solid polymer electrolyte membrane is used as an electrolyte instead of a liquid.

A polymer electrolyte membrane-type fuel cell has a basic principle such that a gas diffusing electrode layer is disposed on both surfaces of a polymer electrolyte membrane, and water is produced by a chemical reaction through the polymer electrolyte membrane by facing an anode toward a fuel electrode and a cathode toward an oxidation electrode, and the reaction energy produced therefrom is converted to electric energy.

As the polymer electrolyte membrane used in a polymer electrolyte membrane-type fuel cell, fluorine-based polymer electrolyte membranes have been widely known with their high performance and durability. Particularly, fluorine-based polymer electrolyte membranes exhibit more superior effects in terms of membrane performance and durability compared to hydrocarbon-based polymers even under a relatively low humidity condition.

Meanwhile, hydrocarbon-based electrolyte membranes have been actively studied based on price competitiveness compared to fluorine-based electrolyte membranes, and the electrolyte membrane performance evaluated through unit cell evaluation has been enhanced to a similar level with fluorine-based electrolyte membrane performance. However, performance and durability tend to decline compared to fluorine-based electrolyte membranes under a humidity condition influence or in a high current density region, and studies for enhancing the same have been in progress.

PRIOR ART DOCUMENTS

Patent Documents

Korean Patent Application Laid-Open Publication No. 2009-0039180

DISCLOSURE

Technical Problem

The present specification is directed to providing a complex electrolyte membrane, an enhanced complex electrolyte membrane and a fuel cell including the same.

Technical Solution

One embodiment of the present specification provides a complex electrolyte membrane including an ion conductive polymer; and two types of silica particles.

One embodiment of the present specification provides an enhanced complex electrolyte membrane including a mixed layer including an ion conductive region and a porous support; and a conductive layer including an ion conductive polymer provided on at least one surface of the mixed layer, wherein the conductive layer includes first silica particles, and the mixed layer includes second silica particles having a smaller average particle diameter than the first silica particles.

One embodiment of the present specification provides a membrane electrode assembly including the complex electrolyte membrane or the enhanced complex electrolyte membrane.

One embodiment of the present specification provides a fuel cell including the membrane electrode assembly.

Advantageous Effects

According to one embodiment of the present specification, excellent performance is obtained under a humidity condition while using a hydrocarbon-based electrolyte membrane having a price competitiveness compared to existing fluorine-based electrolyte membranes.

In addition, according to one embodiment of the present specification, excellent performance is obtained in a high current density region compared to existing hydrocarbon-based electrolyte membranes.

In other words, using a membrane electrode assembly including a complex electrolyte membrane according to one embodiment of the present specification in a fuel cell has a positive influence on enhancing fuel cell performance and/or also on an open circuit voltage (OCV).

DESCRIPTION OF DRAWINGS

FIG. 1 is a diagram mimetically illustrating a complex electrolyte membrane including two types of silica in a conductive layer 1 according to one embodiment of the present specification.

FIG. 2 is a diagram mimetically illustrating, as an enhanced complex electrolyte membrane according to one embodiment of the present specification, an enhanced complex electrolyte membrane including second silica particles 12 in a mixed layer 2 and first silica particles 11 in a conductive layer 1.

FIG. 3 is a diagram mimetically enhanced complex electrolyte membrane embodiment of the present specification, illustrating, as an according to one an enhanced complex electrolyte membrane including second silica particles 12 in a mixed layer 2 and first silica particles 11 and second silica particles 12 in a conductive layer 1.

FIG. 4 is a diagram measuring current density of a hydrocarbon-based complex electrolyte membrane including two types of silica prepared through the example of the present specification and a hydrocarbon-based complex electrolyte membrane including only one type of silica prepared through the comparative example.

FIG. 5 is a diagram measuring an open circuit voltage value of a case including two types of silica prepared through the example of the present specification and a case including only one type of silica prepared through the comparative example.

FIG. 6 is a diagram illustrating a structure of a fuel cell according to one embodiment of the present specification.

MODE FOR DISCLOSURE

Hereinafter, the present specification will be described in detail.

In the present specification, a description of a certain member being placed "on" another member includes not only a case of the one member adjoining the another member but a case of still another member being present between the two members.

In the present specification, a description of a certain part "including" certain constituents means capable of further including other constituents, and does not exclude other constituents unless particularly stated on the contrary.

One embodiment of the present specification provides a complex electrolyte membrane including an ion conductive polymer; and two or more types of silica particles having different average particle diameters.

The present disclosure aims to develop a hydrocarbon-based electrolyte membrane having better performance in various conditions such as a humid or high current density region by improving properties of an existing hydrocarbon-based electrolyte membrane.

In other words, according to one embodiment of the present specification, water absorptivity of an electrolyte membrane is enhanced by adding two types of silica particles, a hydrophilic inorganic material, to a hydrocarbon-based polymer, and overall performance of a fuel cell may be enhanced by increasing resulting proton conductivity.

The present disclosure uses two or more types of fine particles having different average particle diameters. By using such two or more types of fine particles having different average particle diameters, membrane performance and/or durability may be effectively enhanced in a low humidity condition or current density region.

In the present specification, the average particle diameter is measured by TEM observation, and measures an average diameter of the particles.

According to one embodiment of the present specification, the two or more types of silica particles may include first silica particles and second silica particles, and an average particle diameter of the first silica particles may be larger than an average particle diameter of the second silica particles.

In other words, according to one embodiment of the present specification, when using large-sized first silica particles and small-sized second silica particles in a complex electrolyte membrane, performance-enhancing effects may be expected through a hydrophilic property of the large-sized porous first silica particles, and by a disadvantage of nonuniform dispersion of the large-sized first silica particles being supplemented by the small-sized second silica particles, overall enhancement in the membrane performance may be expected, and a decrease in the OCV is prevented by the presence of the second silica particles, which is effective in preventing durability decline.

According to one embodiment of the present specification, the two types of silica particles includes first silica particles having an average particle diameter of 70 nm to 800 nm and second silica particles having an average particle diameter of 3 nm to 40 nm. In addition, according to one embodiment of the present specification, the first silica particles more preferably have an average particle diameter of 100 nm to 250 nm, and the second silica particles more preferably have an average particle diameter of 5 nm to 15 nm.

According to one embodiment of the present specification, the average particle diameters of the first silica particles and the second silica particles satisfying the above-mentioned range is effective in obtaining superior performance under a low humidity condition.

In addition, according to one embodiment of the present specification, a difference in the average particle diameters between the first silica particles and the second silica particles may be in a range of 30 nm to 700 nm and more preferably in a range of 100 nm to 200 nm.

According to one embodiment of the present specification, the first silica particles may be synthetic silica and porous, and the second silica particles may be fumed silica.

According to one embodiment of the present specification, in the complex electrolyte membrane, the second silica particles may be included in 50 parts by weight to 400 parts by weight and more preferably included in 60 parts by weight to 200 parts by weight based on 100 parts by weight of the first silica particles.

According to one embodiment of the present specification, in the complex electrolyte membrane, the silica particles may be included in 1 parts by weight to 20 parts by weight, preferably in 1 parts by weight to 10 parts by weight, and more preferably 1 parts by weight to 5 parts by weight based on 100 parts by weight of the hydrocarbon-based polymer. The silica particle content means a total content of the two or more types of silica particles, and for example, when formed with two types of silica particles of the first silica particles and the second silica particles, the silica particle content means a value adding the first silica particle content and the second silica particle content.

According to one embodiment of the present specification, the first silica particles preferably have a specific surface area of 800 $m^2/g$ or greater. The first silica particles having a specific surface area of 800 $m^2/g$ or greater is effective in enhancing performance under a low humidity condition, and more preferably, the first silica particles may have a specific surface area of greater than or equal to 800 $m^2/g$ and less than or equal to 1,000 $m^2/g$.

According to one embodiment of the present specification, the first silica particles and the second silica particles may have a globular shape, a polygon shape, a stick shape, a cylinder shape and the like, and are not particularly limited in their shapes, but preferably has a globular shape.

According to one embodiment of the present specification, the first silica particles preferably have porosity, and the first silica particles having porosity is effective in enhancing hydrophilicity.

Specifically, according to one embodiment of the present specification, the first silica particles may have pore sizes in a range of 1 nm to 5 nm.

According to one embodiment of the present specification, the two or more types of silica particles preferably have a wide specific surface area and uniform particle sizes.

In addition, in the complex electrolyte membrane according to one embodiment of the present specification, the two or more types of silica particles may be provided inside the hydrocarbon-based polymer, and may be dispersed into the hydrocarbon-based polymer.

According to one embodiment of the present specification as depicted in FIG. 1, including the two or more types of silica particles (e.g., a first silica particle 11 and a second silica particle 12) in a conductive layer 1 in the complex electrolyte membrane is effective in that the silica particles are relatively uniformly distributed inside the hydrocarbon-based polymer.

One embodiment of the present specification provides an enhanced complex electrolyte membrane including a mixed layer 2 including an ion conductive region and a porous support; and a conductive layer 1 including an ion conductive polymer provided on at least one surface of the mixed layer, wherein the conductive layer includes first silica particles 11, and the mixed layer includes second silica particles 12 having a smaller average particle diameter than the first silica particles 11 (FIG. 2), or first silica particles 11 and second silica particles 12 (FIG. 3).

In the present specification, as for descriptions on the first silica particles and the second silica particles, the descriptions provided above may be applied in the same manner.

According to one embodiment of the present specification, in the enhanced complex electrolyte membrane, the conductive layer may include both first silica particles and second silica particles.

In other words, in the enhanced complex electrolyte membrane according to one embodiment of the present specification, the conductive layer may include only first silica particles, and the mixed layer may include only second silica particles.

In addition, according to one embodiment of the present specification, the conductive layer may include first silica particles and second silica particles, and the mixed layer may include only second silica particles. As for descriptions on the first silica particles and the second silica particles, the descriptions provided above may be applied in the same manner, and specifically, an average particle diameter of the first silica particles is larger than an average particle diameter of the second silica particles.

According to one embodiment of the present specification, a porous support may be used in the enhanced complex electrolyte membrane in order to provide mechanical properties and dimensional stability of the membrane, and as the porous support, a support made of a proper material provided with excellent mechanical properties while having high porosity needs to be selected since mechanical durability needs to be maintained without declining performance.

In the present specification, the ion conductive region may mean a region excluding a skeleton formed by the porous support. In addition, the ion conductive region may be a pore region when only the support is present. Furthermore, by including the ion conductive material, ions may migrate through the ion conductive material.

According to one embodiment of the present specification, the porous support may include a hydrocarbon-based material, and the support may be a hydrocarbon-based support.

According to one embodiment of the present specification, the porous support may include a semi-crystalline polymer. According to one embodiment of the present specification, the semi-crystalline polymer may have a crystallinity range of 20% to 80%.

In addition, according to one embodiment of the present specification, the semi-crystalline polymer may include polyolefin, polyimide, polyester, polyacetal (or polyoxymethylene), polysulfide, polyvinyl alcohol, copolymers thereof and combinations thereof, but is not limited thereto.

According to one embodiment of the present specification, the porous support may include those derived from polyolefin-based materials.

According to one embodiment of the present specification, the polyolefin may include polyethylene (LDFE, LLDPE, HDPE, UHMWPE), polypropylene, polybutene, polymethylpentene, copolymers thereof and blends thereof.

The polyamide may include polyamide 6, polyamide 6/6, nylo 10/10, polyphthalamide (PPA), copolymers thereof and blends thereof, but is not limited thereto.

The polyester may include polyester terephthalate (PET), polybutylene terephthalate (PET), poly-1-4-cyclohexylenedimethylene terephthalate (PCT), polyethylene naphthalate (PEN) and liquid crystal polymers (LCP), but is not limited thereto.

The polysulfide includes polyphenyl sulfide, polyethylene sulfide, copolymers thereof and blends thereof, but is not limited thereto.

The polyvinyl alcohol includes ethylene-vinyl alcohol, copolymers thereof and blends thereof, but is not limited thereto.

According to one embodiment of the present specification, the ion conductive region may include an ion conductive polymer in greater than or equal to 60% by volume and less than or equal to 100% by volume, and preferably in greater than or equal to 70% by volume and less than or equal to 100% by volume.

According to one embodiment of the present specification, when the ion conductive polymer is included in the ion conductive region within the above-mentioned range, the enhanced complex electrolyte membrane may exhibit excellent ion conductivity.

According to one embodiment of the present specification, the mixed layer may have a thickness in a range of 2 μm to 10 μm, and preferably in a range of 2 μm to 5 μm.

In addition, according to one embodiment of the present specification, the conductive layer may have a thickness in a range of 1 μm to 10 μm, preferably in a range of 1 μm to 5 μm.

According to one embodiment of the present specification, the enhanced complex electrolyte membrane may have the conductive layer provided on both surfaces of the mixed layer, and each of the mixed layer and the two conductive layers may include silica particles having different average particle diameters.

According to one embodiment of the present specification, the ion conductive region may include an ion conductive polymer, and the ion conductive polymer may include a cation conductive polymer and/or an anion conductive polymer. In addition, the ion conductive polymer may include a proton conductive polymer.

According to one embodiment of the present specification, the ion conductive polymer may use materials generally used as an electrolyte membrane of a fuel cell, and, although not particularly limited thereto, is preferably a hydrocarbon-based polymer.

According to one embodiment of the present specification, the hydrocarbon-based polymers are different from each other, and may each include one, two or more types selected from the group consisting of a sulfonated benzimidazole-based polymer, a sulfonated polyimide-based polymer, a sulfonated polyetherimide-based polymer, a sulfonated polyphenylene sulfide-based polymer, a sulfonated polysulfone-based polymer, a sulfonated polyethersulfone-based polymer, a sulfonated polyetherketone-based polymer, a sulfonated polyether-etherketone-based polymer, a sulfonated polyphenyl quinoxaline-based polymer and a sulfonated partial fluorine-based-introduced polymer.

According to one embodiment of the present specification, the sulfonated partial fluorine-based-introduced polymer may be a polymer in which a sulfone group bonds to at least one side chain and a ratio of the carbon atom numbers and the fluorine atom numbers included in the polymer is greater than 1:0 and less than 1:1.

According to one embodiment of the present specification, the electrolyte membrane may have ion conductivity of 0.001 mS/cm to 500 mS/cm, and the ion conductivity means ion conductivity from RH 32% to RH 100%.

According to one embodiment of the present specification, the hydrocarbon-based polymer has a weight average molecular weight of 100,000 to 2,000,000.

One embodiment of the present specification provides a membrane electrode assembly including the complex electrolyte membrane or the enhanced complex electrolyte membrane.

In addition, one embodiment of the present specification provides a fuel cell including the membrane electrode assembly.

According to one embodiment of the present specification, when the two or more types of silica particles are included in the complex electrolyte membrane or the enhanced complex electrolyte membrane and used in a fuel cell, a membrane performance-enhancing effect is obtained. In other words, when using only the first silica particles compared to using only the second silica particles, a membrane performance-enhancing effect is more superior, however, there is a problem in that an open circuit voltage (OCV) greatly decreases. In view of the above, the inventors of the present disclosure have completed the present disclosure capable of enhancing membrane performance and/or preventing a problem of an open circuit voltage (OCV) decrease by including two or more types of silica particles including first silica particles and second silica particles in a complex electrolyte membrane or an enhanced complex electrolyte membrane.

The fuel cell according to one embodiment of the present specification includes fuel cells generally known in the art. For example, the fuel cell may be any one of a polymer electrolyte membrane-type fuel cell (PEMFC), a direct methanol-type fuel cell (DMFC), a phosphoric acid-type fuel cell (PAFC), an alkali-type fuel cell (AFC), a molten carbonate-type fuel cell (MCFC) and a solid oxide-type fuel cell (SOFC).

Specifically, according to one embodiment of the present specification, the fuel cell may include a stack including membrane electrode assemblies and a separator provided between the membrane electrode assemblies; a fuel supply unit supplying fuel to the stack; and an oxidizer supply unit supplying an oxidizer to the stack.

FIG. 6 is a diagram mimetically illustrating a structure of a fuel cell according to one embodiment of the present specification, and the fuel cell is formed including a stack (60), an oxidizer supply unit (70) and a fuel supply unit (80).

The stack (60) includes one, two or more membrane electrode assemblies, and when two or more membrane electrode assemblies are included, a separator provided therebetween is included.

The separator performs a role of preventing the membrane electrode assemblies from being electrically connected to each other, and transferring fuel and oxidizer supplied from the outside to the membrane electrode assemblies.

The oxidizer supply unit (70) performs a role of supplying an oxidizer to the stack (60). Oxygen is typically used as the oxidizer, and oxygen or air may be injected using a pump (70).

The fuel supply unit (80) performs a role of supplying fuel to the stack (60), and may be formed with a fuel tank (81) storing fuel and a pump (82) supplying the fuel stored in the fuel tank to the stack (60). As the fuel, hydrogen or hydrocarbon fuel in a gas or liquid state may be used, and examples of the hydrocarbon fuel may include methanol, ethanol, propanol, butanol or natural gas.

Hereinafter, the present specification will be described in detail with reference to examples. However, examples according to the present specification may be modified to various different forms, and the scope of the present specification is not to be construed as being limited to the examples described below. The examples of the present specification are provided in order to more fully describe the present specification to those having average knowledge in the art.

Example 1

1) Preparation of Hydrocarbon-Based Polymer

Hydroquinonesulfonic acid potassium salt (0.9 eq.), 4,4'-di fluorobenzophenone (0.97 eq.) and 3,5-bis(4-fluorobenzoyl)phenyl(4-fluorophenyl)methanone (0.02 eq.) were introduced to a 1 L round bottom flask equipped with a Dean-Stark trap and a condenser, and prepared in a dimethyl sulfoxide (DMSO) and benzene solvent using potassium carbonate ($K_2CO_3$) as a catalyst under nitrogen atmosphere. Next, the reaction mixture was stirred for 4 hours in an oil bath at a temperature of 140° C., and after removing an azeotropic mixture by adsorbing the azeotropic mixture to molecular sieves of the Dean-Stark trap while benzene flowed backward, the reaction temperature was raised to 180° C., and the result was M condensation polymerization reacted for 20 hours. After the reaction was terminated, the temperature of the reactant was lowered to 60° C., 4,4'-difluorobenzophenone (0.2275 eq.), 9,9-bis(hydroxyphenyl)fluorine (0.335 eq.) and 3,5-bis(4-fluorobenzoyl)phenyl(4-fluorophenyl)-methanone (0.005 eq.) were introduced to the same flask, and the reaction was started again using dimethyl sulfoxide (DMSO) and benzene under nitrogen atmosphere using $K_2CO_3$ as a catalyst. Next, the reaction mixture was stirred again for 4 hours in an oil bath at a temperature of 140° C., and after removing an azeotropic mixture by adsorbing the azeotropic mixture to molecular sieves of the Dean-Stark trap while benzene flowed backward, the reaction temperature was raised to 180° C., and the result was condensation polymerization reacted for 20 hours. Then the temperature of the reactant was lowered to room temperature, and dimethyl sulfoxide (DMSO) was further added to dilute a product, and the diluted product was poured into excess methanol to separate a copolymer from the solvent. After that, excess potassium carbonate was removed using water, and then the copolymer obtained from filtration was dried for 12 hours or longer in a vacuum oven at 80° C. to prepare a branched sulfonated multi-block copolymer in which hydrophobic blocks and hydrophilic blocks are alternatively linked through chemical bonds.

2) Preparation of Silica Particles (1)

Silica was synthesized through a seed mediation method modifying a stober method, and during the synthesis, a silica precursor having a carbon chain was added so as to produce pores through a heat treatment process after the synthesis. The prepared silica had relatively uniform sizes, and had a specific surface area of 800 m$^2$/g or greater.

3) Preparation of Silica Particles (2) (Fumed Silica)

Fumed silica was prepared by a high temperature gas phase reaction, and this was prepared by chlorosilane being hydrolyzed in flames of 1000° C. or higher formed with oxygen and hydrogen. Basic particles made in the flames were linked to each other through collision to form secondary particles while the surface was still melted, and these were linked in a three-dimensional branched form to produce aggregates or agglomerates. After the reaction, hydrogen chloride gas remaining in the silica was removed under a high temperature air condition. Density of the fumed silica was very low immediately after preparation, and therefore, the density was raised to 50 g/L or greater using a method of deflation using a pressure reducing device.

4) Preparation of Silica-Added Complex Membrane

The hydrocarbon-based polymer, the silica particles (1) and the silica particles (2) were added to a dimethyl sulfoxide (DMSO) solvent in a silica particle (total weight of the silica particles (1) and the silica particles (2)) content ratio of 5% by weight ratio with respect to the hydrocarbon-based polymer, and the result was filtered to prepare a complex membrane composition. Using a doctor blade on a horizontal plate of an applicator in a clean bench, the complex membrane composition was casted on a substrate as a polymer film, the result was maintained for 2 hours or longer at 50° C. for soft baking, and then the result was placed in an oven set at 100° C. and dried for a day to prepare a silica-added hydrocarbon-based complex membrane.

Comparative Example 1

A hydrocarbon-based electrolyte membrane was prepared in the same manner as in Example 1 except that silica particles were not added.

Comparative Example 2

A silica-added hydrocarbon-based complex membrane was prepared in the same manner as in Example 1 except that the silica particles (1) was added in a content ratio of 5% by weight with respect to the hydrocarbon-based polymer.

Comparative Example 3

A silica-added hydrocarbon-based complex membrane was prepared in the same manner as in Example 1 except that the silica particles (2) was added in a content ratio of 5% by weight with respect to the hydrocarbon-based polymer.

Evaluation Example 1

Measurement of Current Density

Current density of the hydrocarbon-based complex membranes prepared in Example 1 and Comparative Examples 2 and 3 was measured by scanning 0 mA/cm$^2$ to 1500 mA/cm$^2$ under a constant current mode using a PEMFC TEST Station, and the measurement was made based on 70° C. under an operating condition of 50% relative humidity. The measurement results are shown in FIG. 4.

In FIG. 4, it was identified that Example 1 using two types of silica (silica (1) and silica (2)) had higher current density compared to Comparative Examples 2 and 3 using only one type of silica, and through this, it was seen that performance was more superior when used in a fuel cell.

Evaluation Example 2

Measurement of Open Circuit Voltage (OCV)

A potential value at 0 mA/cm$^2$ was measured under an open circuit voltage mode using a PEMFC TEST Station, and an open circuit voltage was measured based on 70° C. under an operating condition of 50% relative humidity.

Results of experimental measurements for an open circuit voltage value are shown in FIG. 5, and according to FIG. 5, it was identified that Example 1 using two types of silica particles had a higher open circuit voltage compared to Comparative Example 2 using the first silica particles, and had a similar open circuit voltage value with Comparative Example 3 using only the second silica particles.

In other words, when using only the first silica particles, a membrane performance-enhancing effect is more superior compared to using only the second silica particles, however, there is a problem in that an open circuit voltage (OCV) greatly decreased. However, it was identified that the fuel cell using two types of silica particles according to the example of the present disclosure was capable of preventing an open circuit voltage decrease problem while exhibiting excellent membrane performance.

The invention claimed is:

1. A complex electrolyte membrane comprising:
   a mixed layer including an ion conductive region and a porous support; and
   a conductive layer including an ion conductive polymer provided on at least one surface of the mixed layer,
   wherein the conductive layer includes first silica particles or a mixture of first silica particles and second silica particles,
   wherein the mixed layer only includes second silica particles;
   wherein the second silica particles are present in the complex electrolyte in 50 parts by weight to 400 parts by weight based on 100 parts by weight of the first silica particles,
   wherein the first silica particles and second silica particles have different average particle diameters,
   wherein the first silica particles and second silica particles are dispersed into the ion conductive polymer,
   wherein an average particle diameter of the first silica particles is larger than an average particle diameter of the second silica particles,
   wherein the first silica particles comprise synthetic silica and are porous, and have a specific surface area of 800 m$^2$/g or greater and less than or equal to 1,000 m$^2$/g, and
   the second silica particles comprise fumed silica and have a density of 50 g/L or greater.

2. The complex electrolyte membrane of claim 1, wherein the first silica particles have an average particle diameter of 70 nm to 800 nm and the second silica particles have an average particle diameter of 3 nm to 40 nm.

3. The complex electrolyte membrane of claim 2, wherein a difference in the average particle diameters between the first silica particles and the second silica particles is in a range of 50 nm to 400 nm.

4. The complex electrolyte membrane of claim 2, wherein the second silica particles have a specific surface area in a range of 200 m$^2$/g to 400 m$^2$/g.

5. The complex electrolyte membrane of claim 2, wherein the first silica particles have pore sizes in a range of 1 nm to 5 nm.

6. The complex electrolyte membrane of claim 1, wherein the first silica particles have an average particle diameter of 100 nm to 250 nm and the second silica particles have an average particle diameter of 5 nm to 15 nm.

7. The complex electrolyte membrane of claim 1, wherein the first and second silica particles are present in 1 parts by weight to 20 parts by weight based on 100 parts by weight of the ion conductive polymer.

8. The complex electrolyte membrane of claim 1, which has ion conductivity of 0.001 mS/cm to 500 mS/cm.

9. The complex electrolyte membrane of claim 1, wherein the ion conductive polymer is a hydrocarbon-based polymer.

10. The complex electrolyte membrane of claim 9, wherein the hydrocarbon-based polymer has a weight average molecular weight of 100,000 to 2,000,000.

11. The complex electrolyte membrane of claim 9, wherein the hydrocarbon-based polymer is selected from the group consisting of a sulfonated benzimidazole-based polymer, a sulfonated polyimide-based polymer, a sulfonated polyetherimide-based polymer, a sulfonated polyphenylene sulfide-based polymer, a sulfonated polysulfone-based polymer, a sulfonated polyethersulfone-based polymer, a sulfonated polyetherketone-based polymer, a sulfonated polyether-etherketone-based polymer and a sulfonated polyphenyl quinoxaline-based polymer.

12. An enhanced complex electrolyte membrane comprising:
a mixed layer including an ion conductive region and a porous support; and
a conductive layer including an ion conductive polymer provided on at least one surface of the mixed layer,
wherein the conductive layer includes first silica particles,
wherein the mixed layer includes second silica particles having a smaller average particle diameter than the first silica particles,
wherein the first silica particles are dispersed into the ion conductive polymer,
wherein the first silica particles comprise synthetic silica and are porous, and have a specific surface area of 800 m$^2$/g or greater and less than or equal to 1,000 m$^2$/g,
wherein the second silica particles are present in the complex electrolyte in 50 parts by weight to 400 parts by weight based on 100 parts by weight of the first silica particles, and
the second silica particles comprise fumed silica and have a density of 50 g/L or greater.

13. The enhanced complex electrolyte membrane of claim 12, wherein the first silica particles have an average particle diameter of 70 nm to 800 nm, and the second silica particles have an average particle diameter of 3 nm to 40 nm.

14. The enhanced complex electrolyte membrane of claim 12, wherein the ion conductive region includes an ion conductive polymer.

15. The enhanced complex electrolyte membrane of claim 14, wherein the ion conductive polymer is a hydrocarbon-based polymer.

* * * * *